W. H. DIDLAKE.
RAILWAY ROLLING STOCK AND APPURTENANCE THERETO.
APPLICATION FILED SEPT. 29, 1917.
1,293,727.
Patented Feb. 11, 1919.
6 SHEETS—SHEET 1.
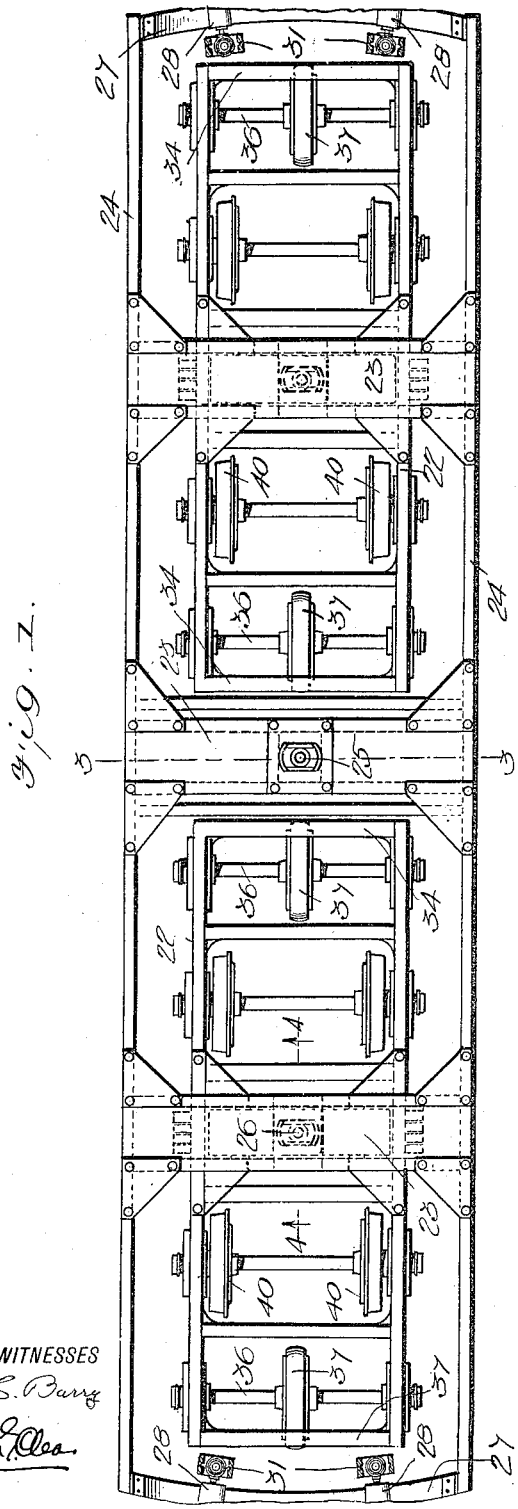
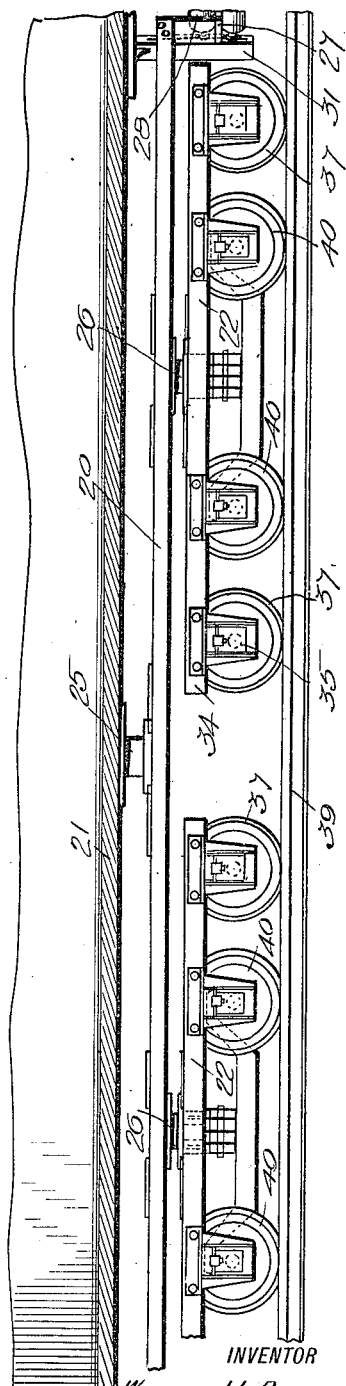
WITNESSES
INVENTOR
WILLIAM H. DIDLAKE
BY
ATTORNEYS

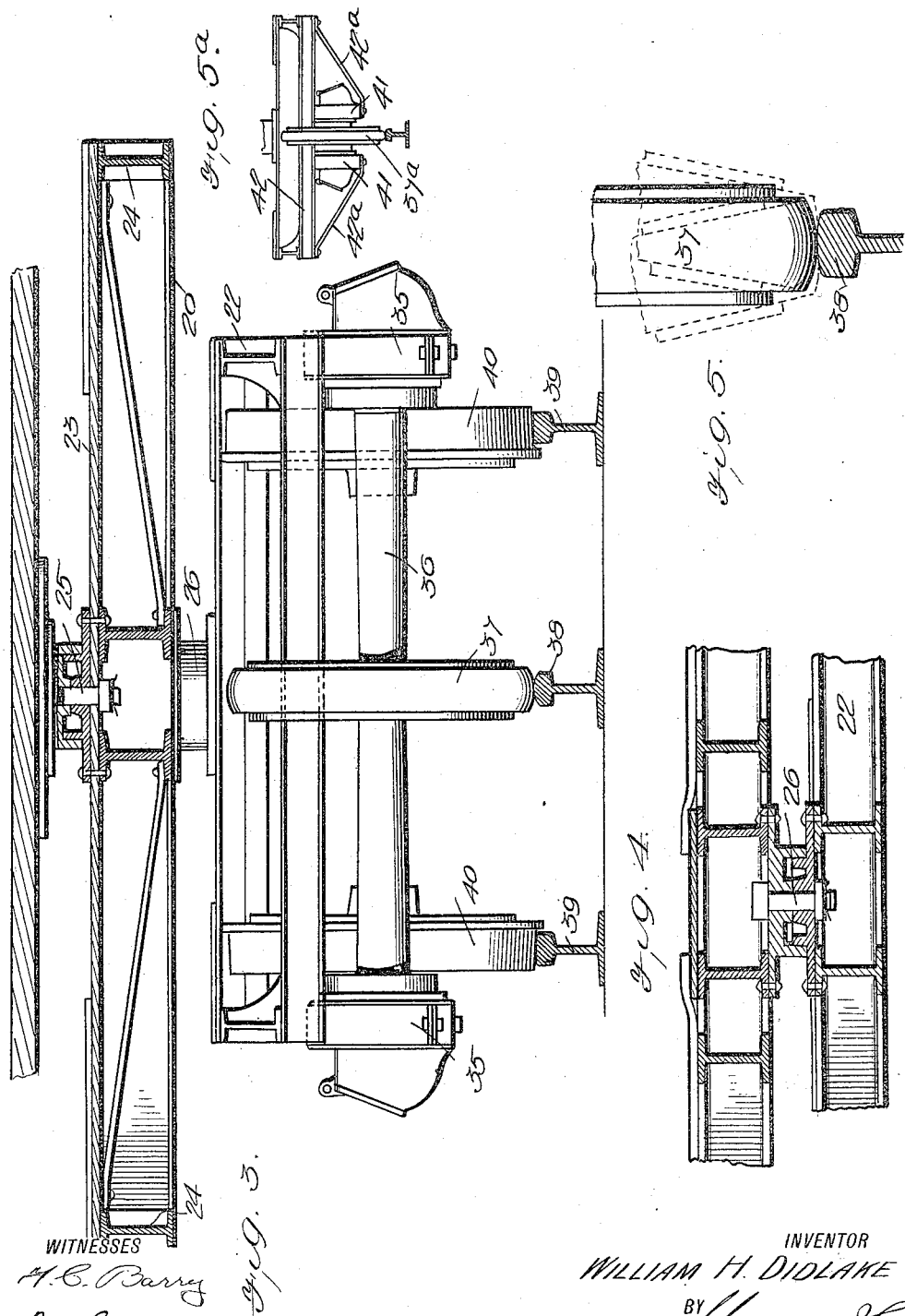

W. H. DIDLAKE.
RAILWAY ROLLING STOCK AND APPURTENANCE THERETO.
APPLICATION FILED SEPT. 29, 1917.
1,293,727.
Patented Feb. 11, 1919.
6 SHEETS—SHEET 3.
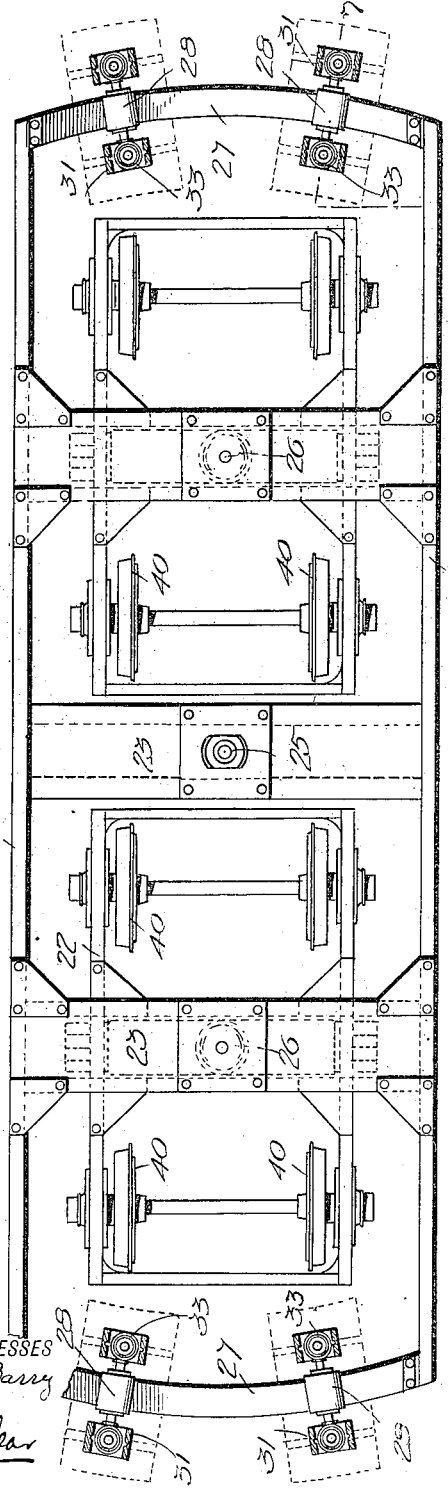
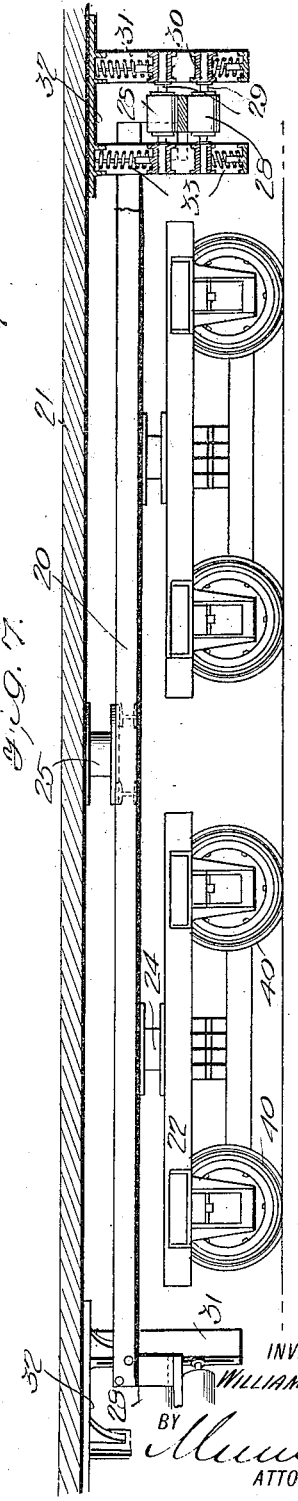

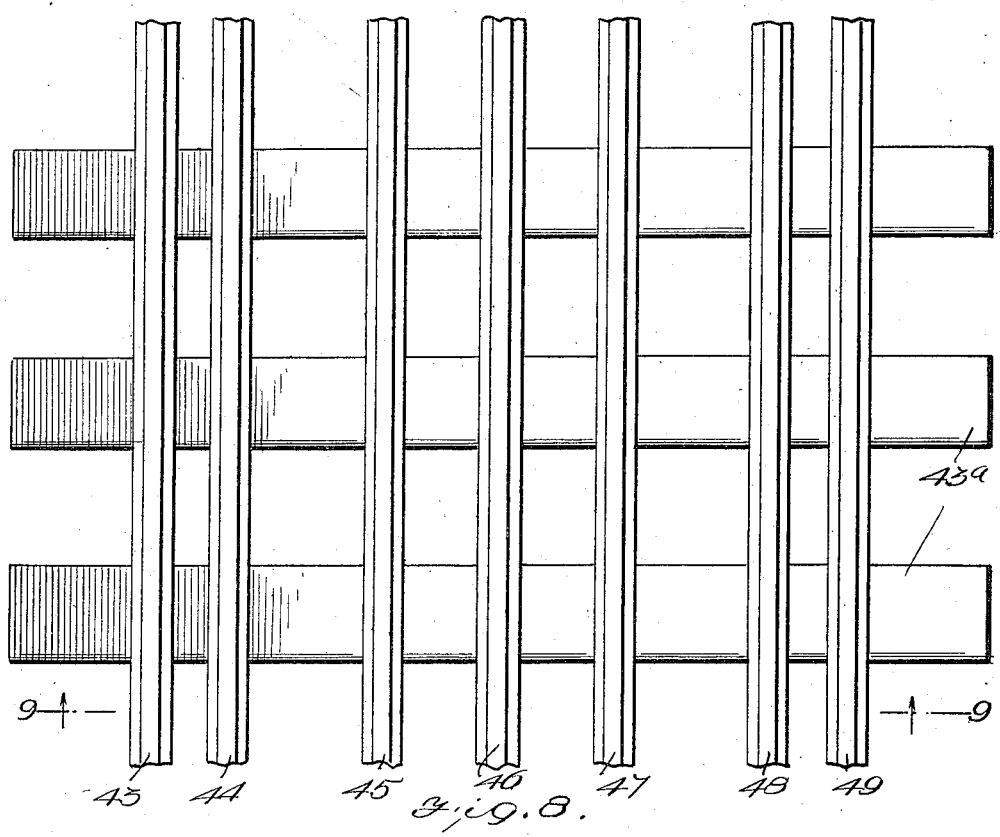
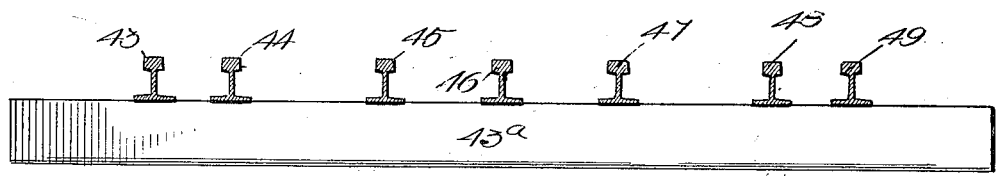

W. H. DIDLAKE.
RAILWAY ROLLING STOCK AND APPURTENANCE THERETO.
APPLICATION FILED SEPT. 29, 1917.
1,293,727.
Patented Feb. 11, 1919.
6 SHEETS—SHEET 5.
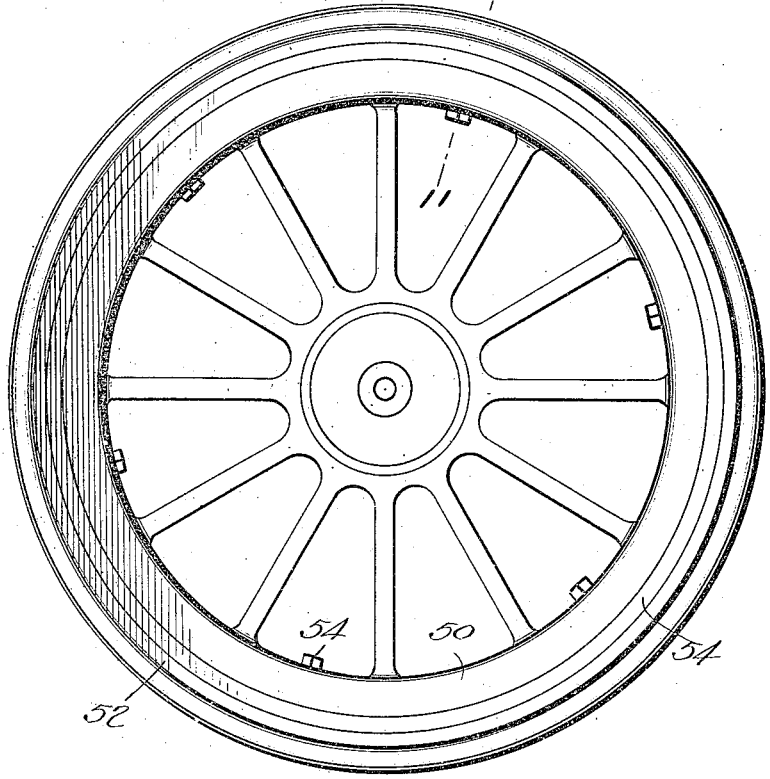
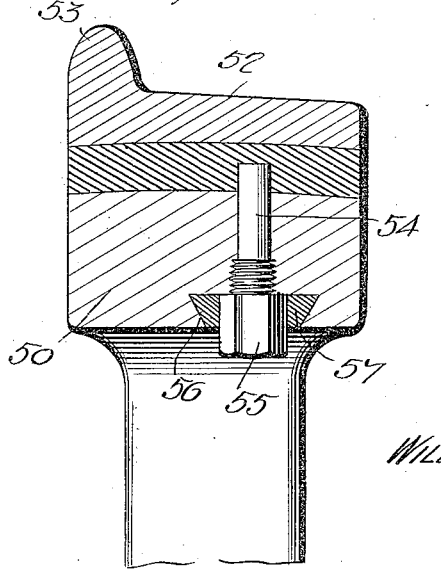
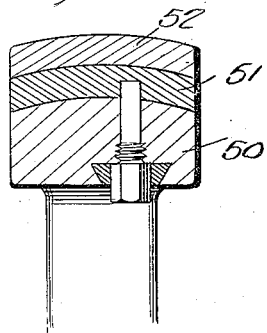
WITNESSES
INVENTOR
WILLIAM H. DIDLAKE
BY
ATTORNEYS

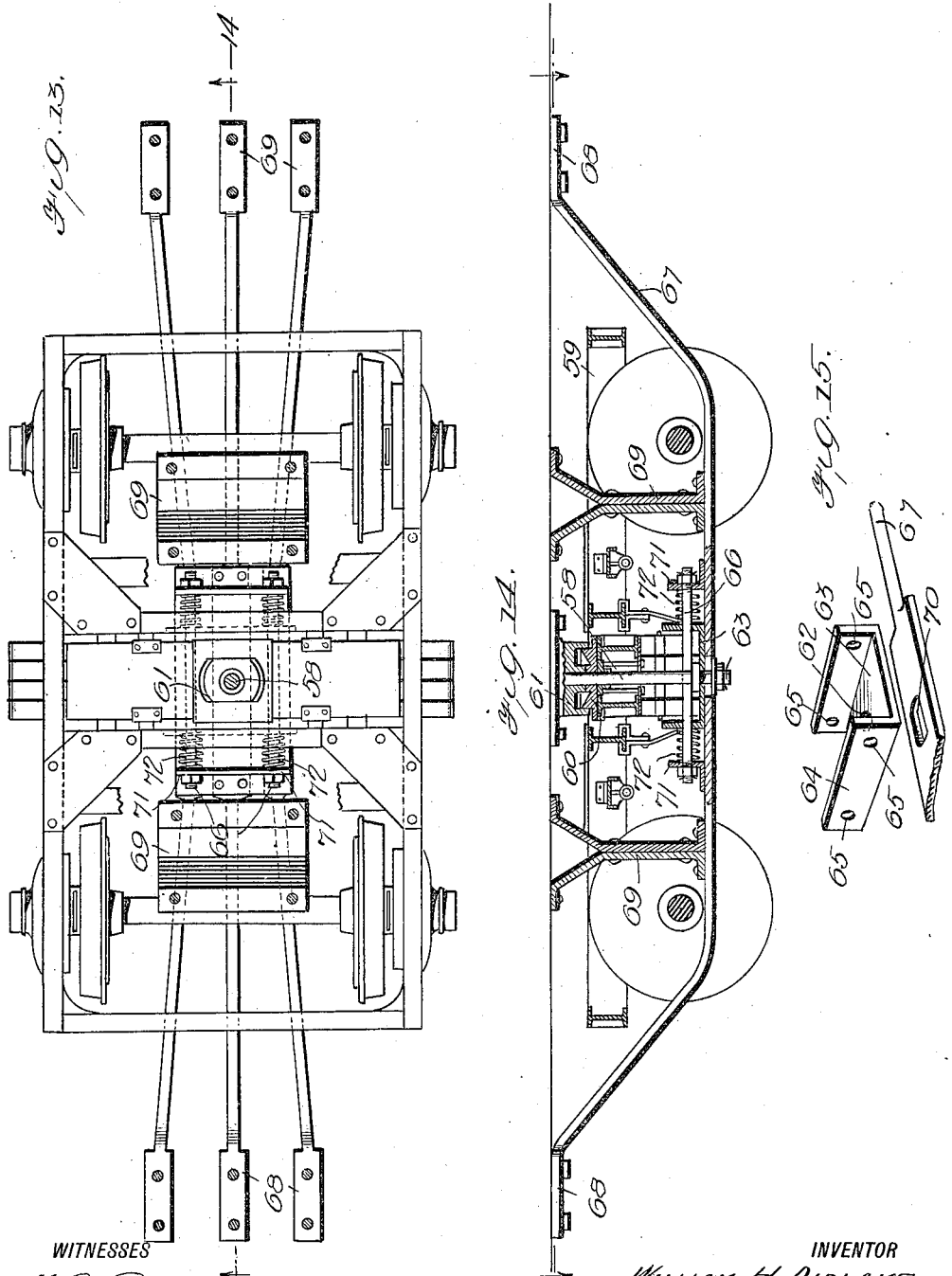

UNITED STATES PATENT OFFICE.

WILLIAM H. DIDLAKE, OF CRYSTAL SPRINGS, MISSISSIPPI.

RAILWAY ROLLING-STOCK AND APPURTENANCE THERETO.

1,293,727.  Specification of Letters Patent.  Patented Feb. 11, 1919.

Application filed September 29, 1917. Serial No. 194,055.

*To all whom it may concern:*

Be it known that I, WILLIAM H. DIDLAKE, a citizen of the United States, and a resident of Crystal Springs, in the county of Copiah and State of Mississippi, have invented a new and useful Improvement in Railway Rolling-Stock and Appurtenance Thereto, of which the following is a specification.

My present invention relates generally to railway rolling stocks and the appurtenances thereof, and its primary object is the improvement in safety and comfort in the several instances to be hereinafter specifically described.

More especially, an object of the present invention is the provision of means which will permit of more ready movements of car trucks with respect to car bodies, and through greater ranges of movement, than is now possible with the trucks directly supported by the car bodies.

A further object is the provision of means whereby to reduce the friction between wheels and rails in use, and promote generally better and more comfortable travel with materially reduced wear as compared with present conditions.

A still further object is the provision of an improved safety truck structure by which to relieve the usually great strain upon king bolts and obviate breakage, in addition to absorbing shock and irregular movements of the trucks.

A still further object of the invention is the provision of a novel track structure and arrangement, the details and relation of which to the foregoing objects, will be presently made plain.

A still further object is the provision of a novel wheel structure, designed to promote safety and particularly desirable in connection with the above.

In the accompanying drawings, forming part of this specification, I have shown several forms of my present improvements, and it is to be understood in the consideration thereof, that other forms may be adopted and utilized, the present ones being taken for purposes of illustration, alone.

In these drawings:

Figure 1 is a top plan view of a supplemental car frame and truck structure, the car body being removed.

Fig. 2 is a side elevation of the parts shown in Fig. 1, below the level of a car body, the latter being in section.

Fig. 3 is an enlarged transverse section taken substantially on line 3—3 of Fig. 1.

Fig. 4 is an enlarged vertical longitudinal section taken substantially on line 4—4 of Fig. 1.

Fig. 5 is an enlarged fragmentary view to show the action in use of one of the central wheels.

Fig. 5ª is a front view of a truck, on a reduced scale, and illustrating a slight modification.

Fig. 6 is a view similar to Fig. 1, illustrating the three points of connection of Figs. 1 and 2 as adapted to a car body and truck construction otherwise as now employed.

Fig. 7 is a side view of the parts shown in Fig. 6, parts being broken away and in section at one end substantially on the line 7—7 of Fig. 6.

Fig. 8 is a plan view of an improved track structure and arrangement.

Fig. 9 is a transverse section taken substantially on line 9—9 of Fig. 8.

Fig. 10 is a side view of my improved car wheel.

Fig. 11 is an enlarged radial section taken therethrough substantially on the line II—II of Fig. 10.

Fig. 12 is a view similar to Fig. 11, on a slightly reduced scale, illustrating the application of the construction shown in Figs. 10 and 11 to one of the series of central wheels.

Fig. 13 is a top plan view of my improved truck structure.

Fig. 14 is a vertical longitudinal section taken substantially on line 14—14 of Fig. 13, and Fig. 15 is a detail fragmentary perspective of certain of the parts seen in Fig. 13 and 14 to be hereinafter specifically referred to.

Referring now to these figures, and particularly to Figs. 1 to 5, inclusive, my invention proposes, in the first instance, the utilization of a supplemental frame or framework 20 between a car body 21 and its trucks 22, the said frame or frame-work 20 as proposed, being of any suitable construction as to its detailed make-up, for instance, of the skeleton type shown in Fig. 1 in particular, it being imperative, however, that it shall include portions capable of supporting three points of pivots, for which in the skeleton form as seen in Fig. 1, it may have crosspieces 23 at spaced points connecting the side bars 24 thereof.

As proposed, this supplemental frame or frame-work 20, is pivotally connected to the car body to swing in a parallel horizontal plane with respect thereto, by a single pivot 25 centrally between the ends of the car body and between the ends of the frame 20.

The trucks 22 may bear the same relation as usual to the car, in so far as their spacing from the center thereof is concerned, and as proposed, are pivotally connected by pivots 26 to the front and rear portions of the frame 20 at equal distances from its central pivot 25 at the car body.

It is obvious that this construction, which may be carried into effect without material increase of cost, admits of greater freedom of movement as well as greater range of movement, of the trucks 22 with respect to the car bodies, curves may be taken more readily, greater speed more safely maintained, and more comfortable riding of the car body assured.

As seen in Figs. 1 and 2, and better shown in Figs. 6 and 7, in the latter of which my improved supplemental frame is seen in connection with the conventional truck structure as now in use, the forward and rear ends of the supplemental frame 20 may have transversely curved and flat end pieces 27 extending between vertically spaced rollers 28 of pairs of rollers disposed at laterally spaced points and upon shafts 29 whose bearings 30 are vertically shiftable in the depending brackets 31 of a frame 32 secured to the lower surface of the car body 21, so that vertical movement of the ends of the supplemental frame 20 will be controlled by springs 33 interposed between the bearings 30 of shafts 29 and the upper and lower ends of the brackets 31. In this way I propose to absorb the shocks of movements which might otherwise be communicated through the supplemental frame 20 and induce regular even movement of the latter, without interfering with its horizontal swinging movement in respect to the car body.

As seen in Figs. 1 to 5, inclusive, to which reference is again made, my invention proposes the extension of the opposite ends of the trucks 22 as seen at 34, to support usual type of journals 35 of supplemental front and rear axles 36, centrally between the ends of the latter of which are secured supplemental wheels 37 preferably of the oval shape seen particularly in Figs. 3 and 5, or having oval shaped tires, it being obvious that the wheels 37 at the forward and rear portions of the two trucks, form a series of wheels in the vertical plane of the longitudinal axis of the car, which by their engagement with supplemental rails 38 disposed centrally between the usual track rails 39, form additional supports for the car body, and a series of rolling supports, between the members of which there is thus no likelihood of difference in speed of rotation.

As well known, the intense wearing friction of the usual side truck wheels 40 upon rails 39, is caused in some measure at least, by their frequent rotation at different speeds in rounding curves and the like, and the presence of the series of wheels 37 constituting a rolling support when effected by such conditions, relieves in a great measure the usual friction so resulting.

As seen clearly in Figs. 3 and 4, the supplemental intermediate rails 38 may have oval treads, which in connection with the oval shape of the supplemental wheels 37, adapts the latter to inclined movements as indicated in dotted lines in Fig. 5.

As seen in Fig. 5$^a$, the wheel 37$^a$ of the series of supplemental centrally disposed wheels, may be supported upon a sub-shaft in journals 41 supported on the truck 42 and braced by brace rods 42$^a$ connecting the lower portions of the journals 41 with the sides of the truck, and thus dispensing with an axle 36 extending the full width of the truck as seen in Figs. 1 to 3, inclusive.

Bearing in mind that the use of supplemental supporting wheels 37 and 37$^a$ of the characters just above described, will necessitate the utilization of a rail centrally between the usual side rails, I have proposed in Figs. 8 and 9, a track structure and arrangement whereby a series of rails may be supported upon a single set of ties 42, so as to form tracks of various gages, each having a central rail for the supplemental series of wheels to engage. This arrangement involves a series of rails 43 to 49, inclusive, of which the outermost rails 43 and 49 are spaced apart to a gage of 7 feet, 2 inches, and the next innermost rails 44 and 48 are spaced to a gage of 5 feet, 6 inches. The rail 46 is disposed centrally of the series so as to act as the central rail for either of the tracks first mentioned, and the rails 45 and 47 are disposed at similar distances upon opposite sides of the central rail 46, so that the rail 45 forms with the rail 49 a gage of 4 feet, 8½ inches, and the rail 47 forms with the other outermost rail 43, a similar gage, whereby as between rails 45 and 49, rail 47 forms the central rail, and as between rails 43 and 47, rail 45 forms the central rail.

In the above manner it is obvious that the different gages of tracks, each with its central rail, may be utilized from time to time, with the entire series of rails supported upon a single set of ties 42.

As seen in Figs. 10, 11 and 12, my invention contemplates the utilization of a safety wheel construction which may be the ordinary flanged truck wheel, and which is particularly adapted as one of the supplemental central wheels above described and as seen in Fig. 12. The structure proposed includes the usual cast frame 50 which is, however, in this instance, provided with an iron band 51 around its peripheral surface and between the same and its steel tread band or shoe 52, which in the instance of the ordinary truck wheel carries a flange 53. The iron band interposed the cast wheel frame 50 and the steel tread band 52, and which absorbs shock and vibrations in use, may with the tread band 52, be suitably secured upon the frame 50, as for instance, by means of the oval shape shown and shrinkage of the same in place, and if desired the iron frame band 51 may be additionally secured against displacement by bolts or pins 54 extending radially through the peripheral portion of the frame 50 and threaded into sockets thereof, the inner threaded ends 55 of these bolts projecting into enlarged recesses 56 of the cast frame, which upon disposition of the bolt or pin in operative position, may be filled with molten metal or other plastic material as indicated at 57, which upon hardening effectively locks the bolt in the position shown.

Thus, should the tread band or shoe 52 break away after excessive wear in use, the iron band 51 surrounding the cast frame 50, will still maintain the latter against shattering or collapsing, as well as derailment and wrecks likely to result therefrom.

As seen in Figs. 13 to 15 inclusive, in the improved truck structure there illustrated, the object of which is to relieve the great strain usually present upon king bolts and to obviate in a great measure the danger of breakage thereof, the king bolt 58 is extended downwardly through the truck frame 59 below the bearings 60 and 61, respectively, of the truck and the car body or the supplemental frame 20, before mentioned, the lower end of the king bolt 58 which is therefore of considerably greater length than the ordinary king bolts, being extended through the central aperture 62 as seen in Fig. 15 of a plate 63.

As seen in the figures mentioned, the plate 63 has upstanding side portions 64 provided with openings 65 adjacent their front and rear edges, through which are extended guide bolts 66 so as to thus guide the plate 63 in its shifting movements with the lower end of the king bolt 58.

I also utilize draw-bars 67 in a longitudinal series, with their central portions below the plane of the plate 63 before mentioned, and with their upper outer forward and rear ends 68 securely fastened to either the car body or the supplemental frame 20, the lower intermediate portions of these draw-bars 67 being further supported by brackets 69 depending from the car body or supplemental frame 20. The central portions of these draw-bars 67 arranged as described, form a seat for the plate 63, the intermediate portion of the central draw-bar 67 of the series, having a slotted opening 70 as clearly seen in Figs. 14 and 15, through which the lower extremity of the king bolt 58 movably projects.

The inner portions of the draw-bars 67 beyond the opposite sides 64 of the plate 63, support angle bars 71 which as seen best in Fig. 13, are secured to the central draw-bar 67 of the series, and support the extremities of the guide bolts 66. The angle bars 71 furthermore form outer abutments for springs 72 coiled around said bolts between the angle bars of the angular sides 64 of the plate 63, so that the latter is thus movable in guided relation in operation under tension of springs 72, and the latter also forms part of the connection which the car body or supplemental frame 20 has with the lower portion of the king bolt 58 through the series of draw-bars 67, so as to support a portion of the pull upon the truck and at the same time permit the lower portion of the king bolt to yield within limits under excessive jolts, jars, and the like.

This construction being, as described, applicable to the supplemental frame 20 previously described, it is obvious that my improvements are well adapted to carry out the objects first above stated, and may be utilized with highly effective results in connection with railways, for the advantage both of the railway companies and the traveling public.

I claim:

1. The combination with a car body and its wheeled trucks, of a supplemental frame between the car body and the trucks, having a central pivot in connection with the car body, spring supports for the forward and rear ends of said supplemental frame, in connection with which the latter is shiftable upon its said pivot, and pivotal connection between the said supplemental frame and the said trucks.

2. The combination with a car body and its wheeled trucks, of a supplemental frame extending in longitudinally parallel relation beneath the car body and centrally pivoted thereto, spring supports carried by the car body for the forward and rear ends of said frame and movably engaging the latter to permit the same to shift upon its pivot, and pivotal connection between the said frame and the said trucks, at opposite sides of the center of the frame.

3. The combination with a car body and its wheeled trucks, of a supplemental frame extending longitudinally beneath the car body in spaced parallel relation thereto and centrally pivoted thereto, said frame having transversely curved tracks at the forward and rear ends thereof, pairs of rollers engaging opposite sides of the said tracks of the frame, spring supports carried by the car body for the said rollers, whereby to yieldingly connect the forward and rear ends of the frame with the car body, and pivotal connections between the said frame and the trucks at opposite sides of the center of the frame.

4. A car wheel having a cast body, a surrounding tread band, and a body supporting band between the tread band and the said wheel body and around the latter, for the purpose described, said body and said bands having oval contacting spaces whereby to prevent their displacement.

5. A car truck having an elongated king bolt depending therethrough below its bearing, a plate having an aperture through which the lower end of the king bolt depends, a series of draw-bars, the intermediate portions of which extend below and form supports for the said plate, abutments carried by the draw-bars at opposite sides of the plate, guide bolts on which the plate is shiftable, connected to and carried by the said abutments, and springs between the abutments and the plate, coiled around the guide bolts, to yieldably connect the lower end of the king bolt with the said draw-bars.

6. A car truck having an elongated king bolt depending therethrough below its bearing, a longitudinally yieldable member to which the lower end of said king bolt is connected, and draw-bars, the intermediate portions of which extend beneath and support said yieldable member and are movably connected thereto.

7. A car truck having an elongated king bolt depending therethrough below its bearing, and draw-bars having their intermediate portions adjacent, and yieldably connected to, the lower end of the king bolt.

8. A car truck having an elongated king bolt depending therethrough below its bearing, draw-bars having their intermediate portions adjacent the lower end of the king bolt, and yielding connections between the draw-bars and the king bolt to permit of limited movement of the lower end of the latter.

WILLIAM H. DIDLAKE.

Copies of this patent may be obtained for five cents each, by addressing the "Commissioner of Patents, Washington, D. C."